Figure 1:
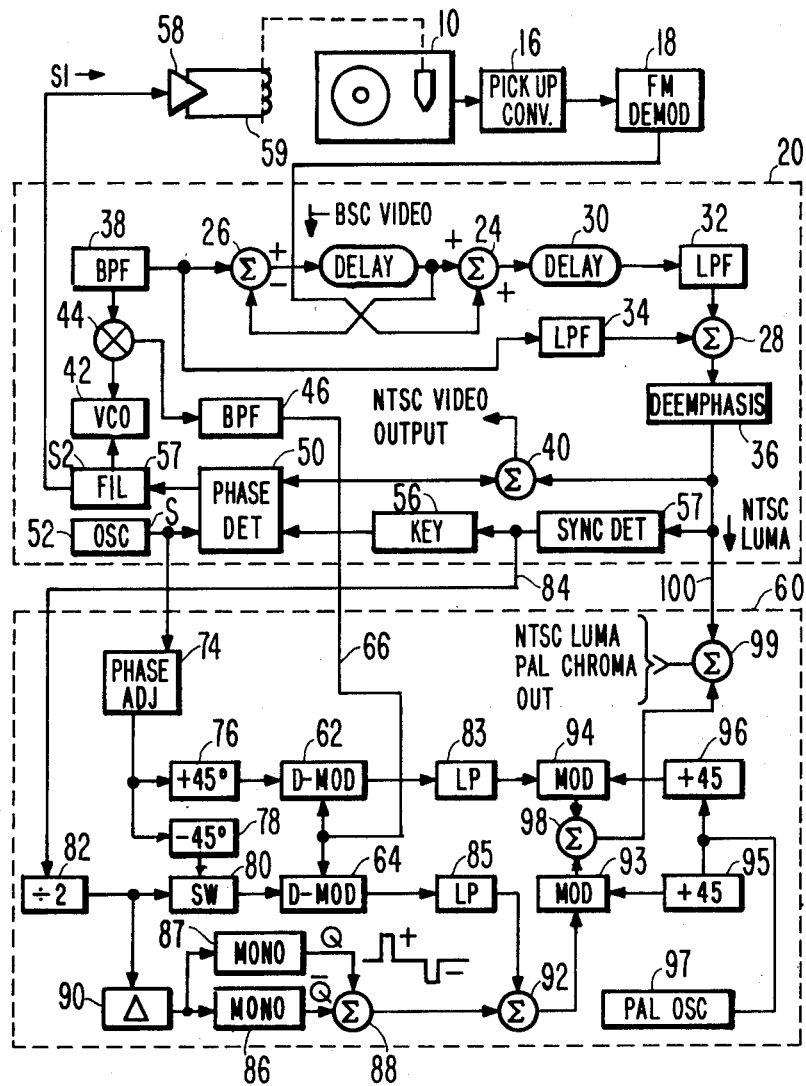

United States Patent [19]

Rutishauser

[11] 4,283,738

[45] Aug. 11, 1981

[54] NTSC TO PAL TRANSCODER

[75] Inventor: Ernst A. O. Rutishauser, Mutschellen, Switzerland

[73] Assignee: RCA Corporation, New York, N.Y.

[21] Appl. No.: 101,847

[22] Filed: Dec. 10, 1979

[30] Foreign Application Priority Data

Jun. 4, 1979 [GB] United Kingdom ............... 19386/79

[51] Int. Cl.³ ............................................... H04N 9/42
[52] U.S. Cl. ..................................................... 358/11
[58] Field of Search .......................................... 358/11

[56] References Cited

U.S. PATENT DOCUMENTS

| | | |
|---|---|---|
| 3,384,706 | 5/1968 | Davidse . |
| 3,449,510 | 6/1969 | Steinkopf ............................. 358/11 |
| 3,891,994 | 6/1975 | Phillips . |
| 3,968,514 | 7/1976 | Narahara et al. . |
| 4,136,358 | 1/1979 | Clemens et al. . |

*Primary Examiner*—Richard Murray

*Attorney, Agent, or Firm*—E. M. Whitacre; J. S. Tripoli; R. G. Coalter

[57] ABSTRACT

R-Y and B-Y color difference components of an NTSC format input signal are demodulated to base-band and a burst flag is added to the R-Y signal. Both the B-Y signal which includes the original base-band burst component and the R-Y signal with the added burst flag are then remodulated on respective quadrature related PAL subcarriers. Alternate line phase reversal is achieved in one embodiment by switching the phase of the R-Y demodulator and inverting the burst flag every other line. In another embodiment the added flag is of constant polarity and the R-Y remodulator reference phase is switched. The remodulator outputs are combined with a luminance component of the NTSC input signal whereby a non-standard video output signal is produced having an NTSC luminance component and a PAL chrominance component to enable monitoring of the NTSC input signal on a PAL color television monitor operating at 525/60 line/field rate.

10 Claims, 2 Drawing Figures

NTSC TO PAL TRANSCODER

This invention relates to transcoders and particularly to transcoders useful, for example, for converting an NTSC standard chrominance signal to one of PAL format.

The NTSC and PAL color television transmission systems are similar to each other in that both systems employ quadrature double sideband suppressed carrier amplitude modulation (QDSSC-AM, hereinafter QAM) for transmission of the color difference signals R-Y and B-Y. Since the carrier is suppressed in QAM, it is necessary that it be regenerated in a receiver to be able to synchronously detect and recover the original color difference signals. To facilitate this regeneration, the QAM signal in both systems includes a burst component of a few cycles of subcarrier frequency transmitted during the "back porch" interval of the horizontal synchronizing period.

Despite the similarities in modulation method mentioned above, conversion of an NTSC chrominance signal to one of PAL format is complicated because of differences in subcarrier frequency, burst phasing, and color difference signal phasing. In the 525 line 59.36 field per second NTSC system, for example, the subcarrier frequency is 3.579545 MHz, the burst vector is of constant direction and aligned with the —(B-y) axis, and the R-Y color difference signal is of constant phase from line to line (leading B-Y by 90°). By contrast, in the PAL 625 line 50 field per second system the color subcarrier frequency is 4.43361875 MHz, burst phase is not constant but "swings" ±45° relative to the —(B-Y) axis from line to line, and the R-Y chrominance component phase alternates between 90° and 270° relative to the B-Y axis from line to line.

A known method of generating a PAL signal from an NTSC signal comprises sampling the NTSC signal at a sampling rate which bears a ratio of small integers to the color subcarrier frequency, the sampling instants being symmetrically disposed about the phase of the B-Y component of the NTSC signal, and re-ordering the samples with a subcarrier phase sequence such as to provide a signal of PAL form. Such a sampled data conversion system is described in U.S. Pat. No. 3,891,994 which issued June 24, 1975, to Phillips, et al. The Phillips converter, however, is relatively complex in that a colored store of the analog type (bucket-brigade) or a number of parallel digital shift registers is needed for the sample generation process.

Another form of NTSC-PAL chrominance converter utilizes what may be termed a switch and mix technique. U.S. Pat. No. 3,384,706 which issued May 21, 1968 to J. Davidse describes such a converter in which the input chrominance signal is switched, at a rate equal to half the line frequency, between two signal paths one of which includes a mixer for multiplying the chrominance signal with a reference carrier of twice the chrominance signal frequency. The mixer output signal (after filtering to remove triple frequency subcarrier components) is then summed with the chrominance signal in the other path to produce a converted signal.

One problem with the switch and mix technique is that the subcarrier frequency is not altered in the process, only the phase of a subcarrier component is altered on a line by line basis. Davidse's solution to this is to demodulate the chrominance signal with a synchronous detector and then remodulate the resultant baseband color difference signals on an appropriate (i.e. PAL) subcarrier.

A more difficult problem with the switch and mix technique, as disclosed in the Davidse patent, relates to the treatment of burst. The mixing process effectively reverses the phase of the R-Y component from line to line and in the PAL system the B-Y and R-Y color difference signals each contain a burst component. During one line interval the resultant burst vector is formed 45° above the —(B-Y) axis and during the next line it appears 45° below the —(B-Y) axis. Davidse explains that when converting from PAL to NTSC (where burst is constant and aligned with the —(B-Y) axis) the mixing process results in improper burst phase and it is necessary to perform the switching of the chrominance signal with an asymmetrical waveform to correct this problem. One may presume that the same solution might apply when converting chrominance signals from NTSC to PAL format.

A variation of the switch and mix chrominance conversion method is disclosed in U.S. Pat. No. 3,968,514 which issued July 6, 1976, to Narahara, et al. There the position of the mixer and switch are reversed, that is, the chrominance signal is applied via two paths to a switch operating at half line frequency which alternately couples each path to an output. One of the paths includes a double subcarrier frequency mixer. If a "true" NTSC format chrominance signal were applied to the input of the chrominance converter of Narahara, et al., the same problems with subcarrier frequency and burst phasing would be encountered as in the Davidse arrangement since mere interchange of the switch and mixer can have no significant affect on the overall transfer function of the converter. Narahara, et al. however, apply what they refer to as an "NTSC like" signal to the converter having a PAL subcarrier frequency and a constant phase burst component aligned midway between the R-Y and B-Y color difference signal axis. Since the "NTSC like" subcarrier is already at the PAL frequency no further frequency conversion is necessary and since the input burst has components aligned with both of the color difference signals a PAL type "swinging burst" is obtained without need for the asymmetrical switching technique used in Davidse.

At this point it is instructive to note that a chrominance converter which may be well suited for converting "NTSC like" signals to PAL format as in Narahara, et al. can present rather troublesome problems in a "true NTSC" to PAL chroma conversion application as in Davidse. As a further illustration, consider the demodulator-remodulator chrominance converter of Carnt, et al. described in U.S. patent application, Ser. No. 822,659 which was filed Aug. 8, 1977, and issued as U.S. Pat. No. 4,200,881 Apr. 29, 1980. There the object is to convert an "NTSC like" chrominance signal in which the color synchronizing burst is of constant phase at an angle of 45° relative to the —(B-Y) axis to a chrominance signal of PAL format. This is achieved by synchronously demodulating the R-Y and B-Y chrominance signal components to baseband, switching the polarity of the baseband R-Y component at the half line frequency rate, remodulating the components on respective quadrature related PAL subcarriers and then combining the remodulated subcarriers. In view of the special phasing of the burst signal (45° relative to —(B-Y) and R-Y) a burst component is produced in both of the B-Y and R-Y baseband signals. Accordingly, upon remodulation and combining of the B-Y and switched R-Y signals, a resultant burst vector is produced which "swings" ±45° relative to —(B-Y) from line to line as the phase of the R-Y component reverses 180° from line to line.

The Carnt, et al. demodulator-remodulator chrominance converter advantageously avoids the need for digital shift registers or bucket brigade delay lines used in the previously described sampled data converter and does not require generation of double subcarrier frequency reference signals required in the aforementioned switch and mix type converters. Unfortunately, it is not well suited for conversion of "true NTSC" chrominance signals to PAL form because in the NTSC standard burst is aligned with the —(B-Y) axis and has no component along the R-Y axis. If a true NTSC signal were applied to a Carnt type transcoder burst (being present only in the B-Y demodulator output) would retain its NTSC character upon remodulation. Moreover, this problem cannot be solved by the Davidse teaching of asymmetrical switch control used in the switch and mix type decoder because in the Carnt, et al. type demodulator-remodulator there is no switching of the B-Y component.

In accordance with one aspect of the present invention periodic spaced apart pulses are combined with a base-band signal synchronously demodulated from a QAM signal and the resultant base-band signal is remodulated on a selected one of two quadrature related subcarriers.

In accordance with another aspect of the invention the periodic pulses are of alternating polarity and a demodulation reference signal supplied to the demodulator is periodically reversed in phase.

In accordance with a further aspect of the invention the periodic pulses are of constant predetermined polarity and the phase of the selected subcarrier is periodically reversed.

Figure 2:
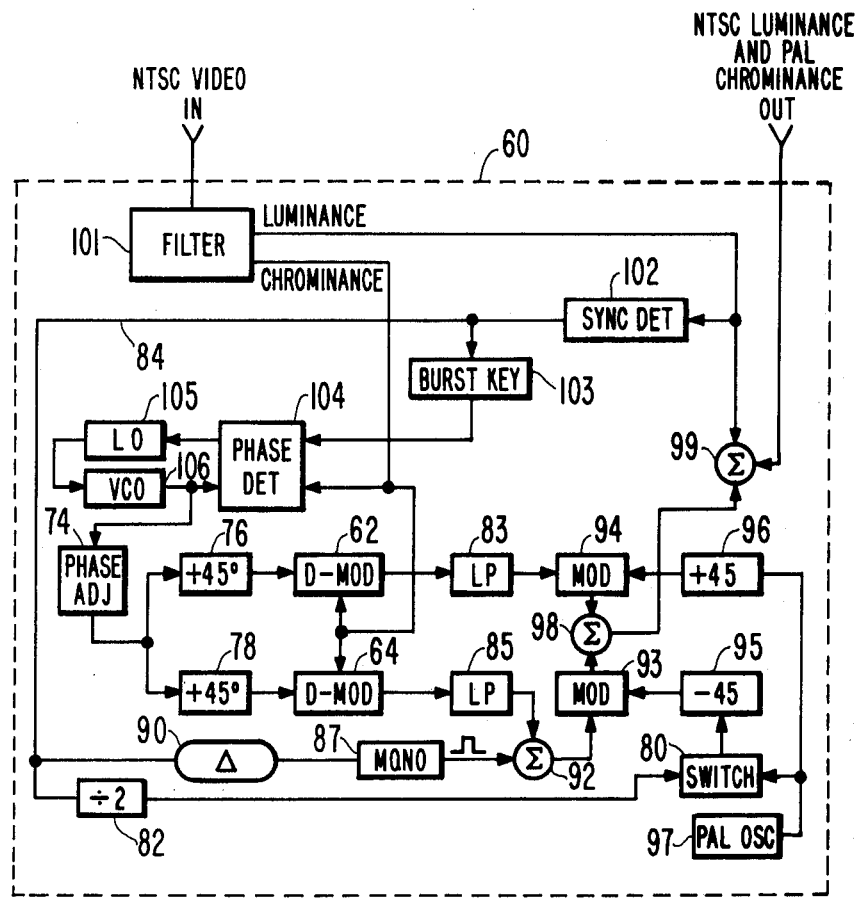

The above and further aspects of the invention are presented in detail in the following description and accompanying drawings wherein common reference numbers designate common elements and in which:

FIG. 1 is a block diagram of a transcoder embodying the invention incorporated in a video disc player; and FIG. 2 is a block diagram illustrating a modification of the transcoder of FIG. 1.

The example of FIG. 1 illustrates an application of the invention for converting an NTSC signal recovered from a video disc player to a signal having an NTSC format luminance component and a PAL format chrominance component to enable use of the player with color television monitors of either standard. FIG. 1 also teaches a particularly advantageous arrangement for interfacing the transcoder of the present invention with video reproducer apparatus of the type having a time base correction system in which certain elements of the time base correction system are shared in common with the transcoder to realize an economy of implementation by virtue of the dual functions thus provided.

The video disc player in FIG. 1 comprises a turntable 10 for rotating video disc 12 and a pickup transducer 14 for recovering video information from the disc. Illustratively, it will be assumed that the player is intended for use with records in which information is stored in the form of topological variations and recovered by sensing capacitance variations between pickup transducer 14 and the record 12. However, it will be appreciated that the transcoder in accordance with the present invention may be used in connection with other systems. The output of transducer 14 is coupled to the input of a pickup converter circuit 16 which comprises a capacitance-to-voltage converter responsive to capacitance variations between a stylus in transducer 14 and the record being played for producing an FM output signal voltage representative of the recorded information. Such records and suitable circuits for implementing the capacitance-to-voltage conversion function of pickup circuit 16 are well known. See, for example, U.S. Pat. No. 3,783,196 entitled "High-Density Capacitive Information Records And Playback Apparatus Therefor" which issued to T. O. Stanley, Jan. 1, 1974, U.S. Pat. No. 3,972,064 entitled "Apparatus And Methods For Playback Of Color Pictures/Sound Records" which issued to E. O. Keizer, July 27, 1976; and U.S. Pat. No. 3,711,641 entitled "Velocity Adjusting System" which issued to R. C. Palmer, Jan. 16, 1973.

Video FM demodulator circuit 18 converts the FM signal produced by pickup circuit 16 to a video output signal. The video signals recorded on the disc are in "buried subcarrier" (BSC) format rather than the conventional NTSC format. As is known, (see, for example, U.S. Pat. No. 3,872,498 entitled "Color Information Translating Systems", which issued to D. H. Pritchard, Mar. 18, 1975), in the BSC format, chrominance information is represented by a color subcarrier of the general form employed in the well-known NTSC format. However, the chrominance component in the BSC format is not located in the high end of the luminance signal video band, as in NTSC, but rather is buried in a lower portion of the video band. An illustrative subcarrier frequency choice is in the vicinity of 1.53 MHz, with the color subcarrier side bands extending ±500 MHz thereabout and with the luminance signal band extending well above the highest color subcarrier frequency (to 3 MHz, for example).

FM demodulator 18 illustratively may be of the pulse counting type or of the phase lock loop (PLL) type. A suitable pulse counting type FM demodulator is disclosed in U.S. Pat. No. 4,038,686 entitled "Defect Detection And Compensation" which issued to A. L. Baker, July 26, 1977. An FM demodulator of the phase lock loop type is described in the U.S. patent application, Ser. No. 984,013 of T. J. Christopher, et al., entitled "FM Signal Demodulator With Defect Detection" which was filed Oct. 2, 1978.

The composite video signal produced by FM demodulator 18 is converted from the BSC format to an NTSC format by video converter 20 (outlined in phantom). Additionally, converter 20 provides separation of the luminance and chrominance signal components, time base correction and generates timing signals for transcoder 60 (outlined in phantom).

The BSC video signal is supplied to the input delay line 22 and is summed with the output of delay line 22 by means of summation circuit 24 to thereby form a comb filter which separates the luminance component from the composite color video signal. The delay of delay line 22 is selected such that the luminance comb filter has a frequency response characterized by multiple response peaks falling at even integral multiples at half the nominal horizontal line frequency and multiple rejection notches falling at odd integral multiples of half the nominal line frequency. Illustratively, a suitable delay would be equivalent to one horizontal scan interval.

The output of delay line 22 is subtracted from the BSC video signal by subtraction circuit 26 to thereby form another comb filter which passes the chrominance component of the composite video signal. This chrominance comb filter has a frequency response characteristic having multiple peaks falling at odd integral multiples of half the nominal horizontal line frequency and multiple rejection notches falling at even integral multiples of half the nominal line frequency.

Delay line 22 may be a conventional LC delay line, an acoustic delay line or may be of a charge couple device (CCD) type. See for example, the article by J. Matob, entitled "Charge Couple Device" which appeared in the January, 1975 issue of Wireless World. Further advantages and examples of comb filtering and video format conversion may be found in U.S. Pat. No. 3,872,498 entitled "Color Information Translating System" which issued to D. H. Pritchard, Mar. 18, 1975; U.S. Pat. No. 3,996,610 entitled "Comb Filter Apparatus For Video Playback Systems" which issued to H. Kawamoto, Dec. 7, 1976 and, U.S. patent application of T. J. Christopher and L. L. Tretter entitled "Video Processing System Including Comb Filters" Ser. No. 966,512 which was filed Dec. 4, 1978.

Since the frequency range of the luminance signal component in the BSC format is substantially the same as in the NTSC format, all that remains to provide a proper NTSC luminance output signal is to compensate for preemphasis which was performed in the recording process and to supplement the signal with information relating to vertical detail which was lost in the luminance comb filtering process Vertical detail supplementation is provided by coupling the output of summation circuit 24 to one input of a further summation circuit 28 via the cascade connection of a delay element 30 and a low-pass filter 32 and coupling the output of subtraction circuit 26 to the other input of summation circuit 28 via a low-pass filter 34. Suitable design parameters for the coupling elements would be: a delay of about 500 nSec for delay element 30 (this compensates for the difference delays through low-pass filters 32 and 34); a passband of 0.500 KHz for low-pass filter 34. Compensation for preemphasis is provided by coupling the output of summation circuit 28 to the input of deemphasis circuit 36 which preferably has a transfer characteristic complementary to that of the preemphasis circuit used in the recording process.

The output of subtraction circuit 26 contains both low frequency information (which is passed by low-pass filter 34 for supplementing vertical detail of the luminance signal as previously mentioned) and the chrominance signal in BSC format. The low frequency information is rejected by connecting the output of subtraction circuit 26 to the input of band-pass filter 38 which preferably has a pass band of about 1 MHz centered at the BSC frequency of nominally 1.53 MHz.

Since the frequency range of the chrominance signal in the BSC format (nominally 1.53 MHz) is lower than its range in the NTSC format (nominally 3.58 MHz), up-conversion of the output signal of band-pass filter 38 is necessary before the chrominance and luminance signals may be added (in summation circuit 40) to produce an NTSC composite video signal. This frequency translation is provided by voltage controlled oscillator (VCO) 42, multiplier 44 and band-pass filter 46. The output frequency of VCO 42 (when at the center of its control range) is nominally 5.11 MHz. Accordingly, multiplier 44, which mixes or multiplies the BSC chrominance signal produced at the output of band-pass filter 38 with the output of VCO 42, produces output signals of nominally 3.58 and 6.64 MHz. Band-pass filter 44 passes the lower frequency signal (which corresponds to the NTSC chrominance signal standard) to summation circuit 40 where it is summed with the NTSC luminance signal produced at the output of deemphasis circuit 36 to thereby provide a composite video output signal in the NTSC format.

Multiplier 44 and band-pass filter 46 may be of conventional design. It is desirable, however, that VCO 42 feature high stability and be capable of wide frequency deviation. A preferred voltage controlled oscillator having a wide deviation range, is disclosed in the U.S. patent application of T. J. Christopher and J. Wilber entitled "Variable Frequency Oscillator" Ser. No. 51,826 which was filed June 25, 1979.

The remaining elements of converter 20 comprise a time base correction servo system in which an error signal, S, produced at the output of color burst keyed phase detector 50 is separated into two components (S1, S2), one being applied in a first feedback path (to transducer 14) for correcting velocity errors and the other being applied via a second feedback path (to VCO 42) for correcting frequency and phase errors of the chrominance component of the NTSC composite video output signal. Detector 50 compares the frequency and phase of the color burst component of the chrominance signal produced at the output of band-pass filter 46 with the standard NTSC reference frequency (3.579,545 MHz) produced by reference oscillator 52. Keying of phase detector 50 is provided by sync detector 54 which detects the horizontal synchronizing pulses in the NTSC format luminance signal produced at the output of deemphasis circuit 36 and supplies an enabling signal to burst gate 56 when each horizontal synchronizing pulse appears. Burst gate 56 then enables phase detector 50 during the so-called "back porch" interval of the horizontal synchronizing pulse where the color burst signal is located. Since phase detector 50 is only enabled during the color burst interval, its output voltage (which represents the servo system composite error signal S) is stored for the remainder of the horizontal line interval by means of a holding capacitor (not shown).

Separation of the composite error signal S into component error signals S1 and S2 is provided by means of filter 57. Which, illustratively, may be of the type described in U.S. Pat. No. 3,965,482 which issued to T. W. Burrus, June 22, 1976. A preferred filter design which includes provisions for transient detection and suppression is disclosed in the pending U.S. patent application of J. A. Wilber and T. J. Christopher, Ser. No. 074,515 filed Sept. 11, 1979.

The signal S1 is applied via driver amplifier 58 to arm stretcher transducer 59 for providing velocity error correction. Transducer 59 is mechanically coupled to the player pickup transducer 14 for controlling the tangential position of the pickup stylus relative to the video information track recorded on the video disc 12. If the disc is out-of-round, for example, transducer 59 changes the effective length of the pickup arm in consonance with rotation of the disc in a sense to compensate for its eccentricity. Arm stretcher transducers suitable for performing this function are described, for example, in U.S. Pat. No. 3,882,267 entitled "Video Playback System Tracking Arm And Pickup Assembly" which issued to M. A. Leedom, May 6, 1975 and U.S. Pat. No. 3,983,318 entitled "Velocity Correction System With Damping Means" which issued to M. E. Miller and J. G. Amery, Sept. 28, 1976.

The signal S2 is applied to VCO 42 in a sense to minimize frequency and phase errors in the chrominance component of the NTSC composite video output signal. As explained in detail in the aforementioned Burrus patent and in the Wilber and Christopher application, the signal S2 includes a lower frequency component that provides correction for very low frequency errors as might be caused, for example, by power line frequency fluctuations influencing the turntable rotational velocity and a broad band component that provides correction for relatively high frequency errors due, for example, to spurious variations in the recovered video signal.

At this point, it is instructive to note, that transcoder 60 could be coupled to any one of several points within video converter 20 for obtaining an NTSC or "NTSC like" chrominance signal for conversion to PAL format. As an example, an "NTSC like" chrominance signal is produced at the output of band-pass filter 38. This signal while desirably separated from the accompanying luminance component is not of NTSC subcarrier frequency (it is about 1.53 MHz, as previously explained), and includes jitter components (i.e. time base errors) not fully corrected for by the action of arm-stretcher transducer 59. Although the actual value of the subcarrier frequency of the chrominance signal supplied to transcoder 60 is not critical (i.e., it need not be NTSC standard) the presence of uncompensated timebase errors in the signal at the output of band-pass filter 38 makes that point less desirable than others for obtaining the chrominance signal to be converted.

Another alternative would be to derive the chrominance signal from the NTSC composite video output of summation circuit 40. At that point, all time base errors in the chrominance signal have been corrected and the frequency has been translated to NTSC standard by means of VCO 42 and multiplier 44 as previously explained. If the NTSC composite video output signal were utilized as the input to converter or transducer 60, however, it would be necessary to separate the luminance and chrominance components for transcoding purposes. This would, in the example of FIG. 1, require a duplication of elements which is unnecessary.

More specifically, video converter 20 includes comb filters comprising elements 22, 24, and 26 which desirably separate the luminance and chrominance signals. Since, in this example of the invention time base correction and subcarrier frequency translation are performed after comb filter separation, the most desirable point at which to obtain the chrominance signal for transcoding to PAL format is at the output of band-pass filter 46. In video reproducer apparatus of the type in which time base correction is performed prior to comb filter separation it will be appreciated with the output signal may be taken directly from the output of the comb filter. To summarize, the advantage in taking the chrominance signal for transcoding from the output of band-pass filter 46 is that it is fully time base corrected at that point, and is also separated from the luminance component so that the comb filters in video converter 20 which serve to separate luminance and chrominance signals for purposes of time base correction and subcarrier frequency translation also serve the additional function of separating those signals for purposes of translation of the chrominance component to PAL form in transcoder 60.

Two further elements in video converter 20 which are shared, in a manner of speaking, with transcoder 60, are horizontal sync detector 54 and oscillator 52. As applied to transcoder 60, oscillator 52 is used as a source of NTSC reference frequency from which a pair of quadrature related demodulation subcarriers are derived. Sync detector 54 is utilized for generating a half line rate switching signal that is utilized for periodically reversing the phase of one of the demodulating subcarriers and for generating a burst flag signal comprising periodic spaced apart alternating polarity pulses.

Transcoder 60 comprises a pair of synchronous demodulators 62 and 64 each of which receives (via conductor 66) the quadrature amplitude modulated NTSC chrominance signal produced at the output of band-pass filter 46 and a respective one of two quadrature related demodulation reference subcarriers. The output of oscillator 52 is applied via phase adjuster 74 to inputs of phase shift networks 76 and 78 which produce respective quadrature related demodulation subcarriers for demodulators 62 and 64 respectively. The output of network 76 is coupled directly to demodulator 62 and the output of network 78 is coupled to demodulator 64 via carrier reversing switch 80.

For purposes of the invention, in the embodiment of FIG. 1, it is necessary that the demodulation reference signals or subcarriers supplied to demodulators 62 and 64 exhibit a quadrature relationship (one must lead or lag the other by 90°). This may be done, as shown, by shifting the oscillator phase by +45° by one network (76) and −45° by the other (78). Alternatively, the networks may impart any amount of phase shift so long as the net phase difference between the reference carriers is substantially 90°. Thus, if desired, one may replace one of networks 76 and 78 with a 90° phase shift network and thereby eliminate the need for the other network.

The purpose of phase adjuster 74 is to provide fine adjustment of the phase of both of the demodulation reference signals to control the demodulation axis of both demodulators. Specifically, phase adjuster 74 is set to provide phase shift of a value such that demodulator 62 demodulates the B-Y component of the chrominance signal supplied to it. Since the phase difference of the reference signals is 90°, demodulator 64 therefore will demodulate the R-Y component of the chrominance signal since the color difference signals in NTSC (and PAL also) are quadrature related.

The output signals produced by demodulators 62 and 64 contain sum as well as difference demodulation products. The sum products are removed from the output signals by means of lowpass filters 83 and 85 which, illustratively, have an upper corner (cutoff) frequency substantially less than the color burst frequency whereby a baseband B-Y chrominance signal is produced at the output of filter 83 and a baseband R-Y or its inverse −(R-Y) is produced at the output of filter 85. The phasing of the R-Y signal relative to B-Y is dependent upon the condition of switch 80 which reverses the phase of the reference subcarrier during every other horizontal line thereby reversing the polarity of the R-Y base-band signal from line to line. This alternation of phase (and thus polarity of the R-Y base-band signal) is provided by means of divider 82 which has an input coupled via conductor 84 to the output of sync detector 54 for receiving horizontal synchronizing pulses (preferably freed of horizontal equalizing pulses by means, for example, of applying the signal to a monostable multivibrator (not shown) having an output pulse period greater than 32 but less than 64 microseconds), and an output for supplying half rate control signals to switch 80. The switch may be a conventional keyed phase inverter which imparts a 0° or 180° phase shift to the reference signal produced by network 78 depending on the level of the signal produced by divider 82.

The base-band B-Y component of the chrominance signal produced by demodulator 62 includes a base-band burst component. This results because the reference signal supplied to demodulator 62 is aligned or phased with the B-Y axis and in the NTSC standard the color burst is aligned with the −(B-Y) axis. Since a synchronous detector produces a maximum output for signals which are either in phase or 180° out of phase (the difference being merely a polarity reversal) and minimal (zero) output for signals in quadrature, it follows that the B-Y base-band signal both (1) contains a base-band burst component and (2) the magnitude of the burst component is maximal, that is, it is as great as can be produced by synchronous demodulator 62.

By contrast, no base-band burst component is produced at the output of demodulator 64 (assuming perfect quadrature phasing) and this is true regardless of the condition of switch 80 since the addition of either 0° or 180° to one of two quadrature related signals can only result in a quadrature relationship.

As previously mentioned, switch 80 reverses the phase of the demodulation reference carrier supplied to demodulator 64. Since divider 82, which controls switch 80, divides the horizontal line frequency by two, the carrier phase reversals occur at the half line frequency rate so that during one line period demodulator 64 produces an R-Y base-band output signal and during the next line period it produces a −(R-Y) baseband output signal. Since the reference carrier supplied to the B-Y demodulator is constant, there is no alteration in phase of the B-Y base-band output signal. Accordingly, insofar as the B-Y and R-Y base-band color difference signals are concerned the result at this point conforms to the PAL standard color difference signals except for burst.

A PAL type "swinging" burst may be realized in accordance with the invention by generating periodic spaced apart pulses of alternating polarity, adding the pulses to the base-band R-Y color difference signal, remodulating both color difference signals on respective quadrature related subcarriers of PAL frequency and summing the subcarriers. By adding such an alternating burst "flag" to the alternating R-Y base-band signal the remodulated R-Y component includes an alternating burst component which is necessarily in quadrature with the constant phase −(B-Y) burst component since the remodulation is done with quadrature related subcarriers. The resultant vector sum of the combined burst signals therefore, swings +45° relative to the −(B-Y) axis from line-to-line.

Creation of a proper PAL type "swinging" burst in the example of FIG. 1 is done at the base-band level as opposed to the carrier level burst reinsertion method. An advantage of the base-band burst insertion technique of the arrangement of FIG. 1 is that one need not go to the complexity required for blanking modulated signals during the burst interval and then somehow reinserting burst carriers of proper phase in the blanked intervals. (Advantages over the sampling method and the mixer type of converters have been previously mentioned).

Burst flag generation is provided in FIG. 1 by means of monostable multivibrators 87 and 86, summing circuit 88 and delay element 90. The purpose of element 90 is to provide delay of transitions of the half line frequency signal produced by divider 82 so as to trigger multivibrators 87 and 86 at the beginning of the color burst interval. Each multivibrator is selected to provide an output pulse having a width equal to the width of a color burst signal in the PAL standard. Multivibrator 87 is triggered by positive transistions of the delayed half line rate signal provided by delay element 90 (which also may be a multivibrator) to produce a positive going output pulse every other line at its true (Q) output. Multivibrator 86 is negative edge triggered by the half line rate signal to produce a negative going output signal at its complement ($\bar{Q}$) output during the intermediate lines. The true and complemented outputs of the multivibrators are then combined in summing circuit 88 (which may be a simple resistive summing network) to provide the alternating polarity burst flag signal which is then combined in summing circuit 92 with the alternating polarity R-Y baseband signal to provide a composite base-band signal.

Remodulation of the base-band B-Y signal and the composite base-band signal on respective quadrature related PAL subcarriers is provided by means of modulators 93 and 94, phase shifters 95 and 96 and PAL oscillator 97. Oscillator 97 supplies a subcarrier of PAL frequency to network 95 which provides phase lag of 45° and to network 96 which provides phase lead of 45°. As was mentioned with regard to networks 76 and 78, the actual phase shift values are not critical as long as the phase difference between the subcarrier at the output of network 96 differs from that at the output of network 95 by 90°. Also, as previously mentioned, one of the networks may be omitted if the other is adjusted to provide a 90° phase shift. The quadrature related subcarriers produced by networks 95 and 96 are applied to modulators 93 and 94, respectively. Modulator 93 modulates the composite base-band signal (alternating R-Y plus alternating burst flag) on the subcarrier provided by network 95. Modulator 94 modulates the base-band B-Y signal (including the fixed base-band burst component) on the subcarrier provided by network 96.

The outputs of modulators 93 and 94 are added vectorially (i.e., linearly) in summing circuit 98 to provide a PAL standard chrominance output signal which is supplied to one input of summing circuit 99. A conductor 100 is coupled from the output of deemphasis circuit 36 to the other input of summing circuit 99 to thereby provide a composite signal at the output of circuit 99 having a NTSC standard luminance component and a PAL standard chrominance component. This non-standard output signal may be applied to a PAL type color television monitor for viewing. The different line format and field rate (525 lines, 59.96 fields per second) of the NTSC standard luminance signal may cause a moderate reduction in the height of the raster produced on the PAL monitor but the chrominance signal, being of proper PAL format, may be expected to provide reasonably good color fidelity.

In FIG. 2 transcoder 60 has been modified to reduce the number of monostable multivibrators in the burst flag generator and to operate from a source of composite NTSC luminance and chrominance input signals rather than separated signals as shown in FIG. 1. Here, rather than adding an alternating polarity burst flag to an alternating polarity signal, a non-alternating burst flag is added to a non-alternating R-Y base-band signal and the polarity of the composite signal is reversed from line to line by reversing the polarity of the remodulation subcarrier. Also, signal separation, reference carrier generation and timing signal generation are all provided for by elements within the transcoder.

In more detail, a filter 101 has been added to transcoder 60 for receiving an NTSC composite video input signal and producing separated chrominance and luminance output signals. Illustratively, filter 101 may comprise a low pass section for passing the luminance component and a band-pass section having a center frequency above the cutoff frequency of the low pass section for passing the chrominance component. As in FIG. 1, the luminance signal is supplied to the input of summing circuit 99 and the chrominance signal is applied to the inputs of demodulators 62 and 64.

Generation of timing and reference signals is provided for by the addition of a sync detector 102, a burst key generator 103 and a phase lock loop comprising a phase detector 104, a low pass filter 105 and a voltage controlled oscillator 106. Sync detector 102 functions (as detector 54 in FIG. 1) to supply horizontal synchronizing pulses to conductor 84 and to the input of burst key generator 103 which, in turn, supplies enabling pulses to a phase detector 104 during the burst interval. Phase detector 104, when enabled, compares the phase of the burst component of the chrominance signal with the output of VCO 106 and produces an error signal that is filtered by low pass filter 105 and fed back to VCO 106 to phase lock the output of VCO 106 to the burst phase. The output of VCO 106 is then applied to the input of phase adjuster 74. This "local" generation of the demodulation subcarrier by phase locking a VCO to the phase of burst is, in a sense, opposite to the approach of FIG. 1 in that there the phase of up converted burst was locked to that of a fixed frequency oscillator. The results are similar however, in that in either case, there is a predetermined relationship of burst and oscillator phasing and fine adjustment of phase is provided for by phase adjuster 74.

Other modifications in FIG. 2 are that negative edge triggered multivibrator 86 and summing circuit 88 are deleted. The input of delay element 90 is connected to conductor 87 rather than to the output of divider 82. The true output of positive edge triggered multivibrator 87 is connected directly to the input of summing circuit 92 rather than via summing circuit 88. Finally, switch 80 is interposed between the output of PAL oscillator 97 and the input of phase shift network 95, the output of network 78 being now connected directly to the reference signal input of demodulator 64.

Operation of the transcoder of FIG. 2 is substantially the same as that previously described for FIG. 1 with the exceptions noted above. Movement of switch 80 from the demodulation carrier position to the remodulation carrier position changes its function from one of inverting only the base-band R-Y signal to that of inverting the modulated composite R-Y and burst flag signals. There is no need in this embodiment for summing an alternating polarity base-band burst flag with the non-alternating R-Y base-band signal. This simplification allows the dispensing with monostable multivibrator 86 but requires doubling the triggering rate of multivibrator 87. For this reason the input of delay element 90 is connected directly to conductor 84 rather than to the output of divider 82.

Various modifications may be made to the embodiments of the invention disclosed without departing from the spirit and scope of the invention as defined in the following claims. Some of these modifications, such as the phase shift parameters of networks 76, 78, 95 and 96 have been discussed in detail. Other minor modifications, such as interchanging the position of switch 80 relative to its associated phase shift network (78 or 95) will be readily apparent to one of skill in the art. It will further be appreciated that although the invention has been illustrated in the specific context of a chrominance signal transcoding application, the general principles of the invention may be utilized in other applications, such as data transmission or in the transmission of L-R (left minus right) and F-B (front minus back) position difference signals in quadraphonic transmissions.

What is claimed is:

1. A transcoder comprising first and second synchronous demodulators, input means for supplying a quadrature amplitude modulated input signal to each of said synchronous demodulators, first oscillator means for supplying first and second quadrature related reference signals to said first and second demodulators, respectively, for causing said demodulators to produce respective first and second baseband output signals, second oscillator means for producing third and fourth quadrature related reference signals, a first modulator responsive to said third reference signal and said first baseband signal for producing a first modulated output signal, a second modulator responsive to said fourth reference signal and said second baseband signal for producing a second modulated output signal and output means for combining said modulated output signals to provide a composite output signal, characterized by:

pulse generator means for producing periodic spaced apart pulses;

combiner means for combining said periodic spaced apart pulses with said second baseband signal for causing said second modulated output signal produced by said second modulator to include a modulated periodic pulse component; and means for periodically reversing the phase of a selected one of said second and fourth reference signals.

2. The combination recited in claim 1 wherein:

said pulse generator means is of a type including means for causing said periodic spaced apart pulses to alternate in polarity from pulse to pulse; and wherein said selected one of said second and fourth reference signals is said second reference signal.

3. The combination recited in claim 2 wherein said pulse generator means comprises:

a source of trigger signals;

a divider responsive to said trigger signals for producing a square wave;

a pair of monostable multivibrators;

means for triggering one of said multivibrators upon a transition of a given sense of said square wave signal and for triggering the other of said multivibrators upon a transition of opposite sense of said square wave signal;

means for combining output signals produced by said multivibrators so as to produce alternating polarity spaced apart output pulses for application as said spaced apart pulses to said combiner means.

4. The combination recited in claim 1 wherein:

said periodic spaced apart output pulses produced by said pulse generator means are each of a given polarity; and wherein said selected one of said second and fourth reference signals is said fourth reference signal.

5. A transcoder for use with a source of NTSC standard luminance and chrominance input video signals for producing an non-standard video output signal having a PAL format chrominance component and an NTSC format luminance component so as to enable monitoring of said input video signals on a PAL type color television monitor, said transcoder comprising:

first demodulator-remodulator means for demodulating said chrominance input signal along a first demodulation axis to provide a first baseband signal having a B-Y color difference component and a burst component and for remodulating said first baseband signal on a first PAL subcarrier;

second demodulator-remodulator means for demodulating said chrominance input signal along a second demodulation axis in quadrature with said first demodulation axis for providing a second baseband signal having an R-Y color difference component devoid of burst component and for remodulating said second baseband signal on a second PAL subcarrier in quadrature with said first PAL subcarrier;

burst flag generator means responsive to said luminance input signal for producing a baseband burst flag signal;

combiner means for combining said baseband burst flag signal with said second baseband signal;

circuit means synchronized with a recurrent horizontal synchronizing component of said luminance signal and coupled to said second demodulator-remodulator means for effectively reversing the phase of the remodulated output signal thereof upon the occurrence of each horizontal synchronizing component; and output means for combining said luminance input signal with the output signals produced by said first and second demodulator-remodulator means to produce said non-standard output signal.

6. A transcoder as recited in claim 5 wherein said burst flag generator means comprises:

a pair of monostable multivibrators;

a trigger circuit responsive to said recurrent horizontal synchronizing component of said luminance signal for alternately triggering said multivibrators; and an output circuit responsive to the alternately triggered multivibrators for producing an output signal of spaced apart alternating polarity pulses for application as said burst flag signal to said combiner means.

7. A transcoder as recited in claim 6 wherein said circuit means comprises means for alternately reversing the phase of a subcarrier reference signal supplied to the demodulator portion of said second demodulator-remodulator means in a timed relationship with the alternate triggering of said multivibrators.

8. A transducer as recited in claim 5 wherein said burst flag generator means comprises:

a monostable multivibrator having an output for producing said burst flag signal; and a trigger circuit responsive to said recurrent horizontal synchronizing component of said luminance signal for triggering said multivibrator.

9. A transcoder as recited in claim 8 wherein said circuit means comprises:

switch means responsive to said recurrent horizontal synchronizing component of said luminance signal for reversing the phase of said second PAL subcarrier upon occurrence of each horizontal synchronizing component.

10. A transcoder as recited in claim 5 further comprising video reproducer apparatus for supplying said NTSC standard luminance and chrominance input video signals to said transcoder, said apparatus including video processor means having a first circuit node at which said luminance input signal is produced and a second node at which said chrominance input signal is produced and further comprising:

means coupling said first node to said output means, to said burst flag generator means and to said circuit means for supplying said luminance input signal thereto; and means coupling said second node to each of said demodulator-remodulator means for supplying said chrominance input signal thereto.

* * * * *